(12) United States Patent
Utterman et al.

(10) Patent No.: US 9,012,055 B2
(45) Date of Patent: Apr. 21, 2015

(54) MECHANICAL SUPPORTS FOR IMPROVING RESISTANCE TO MECHANICAL STRESS IN BATTERY CELLS

(75) Inventors: Erik A. Utterman, San Francisco, CA (US); Justin R. Wodrich, Campbell, CA (US); Sheba Devan, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 255 days.

(21) Appl. No.: 13/490,312

(22) Filed: Jun. 6, 2012

(65) Prior Publication Data

US 2013/0330585 A1 Dec. 12, 2013

(51) Int. Cl.
- *H01M 10/04* (2006.01)
- *H01M 2/02* (2006.01)
- *H01M 4/00* (2006.01)
- *H01M 2/14* (2006.01)
- *H01M 10/052* (2010.01)

(52) U.S. Cl.
CPC .......... *H01M 2/0207* (2013.01); *H01M 2/0275* (2013.01); *H01M 10/0436* (2013.01); *H01M 10/052* (2013.01); *H01M 2/026* (2013.01)

(58) Field of Classification Search
CPC  H01M 10/0436; H01M 10/252; H01M 2/026
USPC ......... 429/122, 140, 234, 238, 247, 306, 304, 429/307, 209; 29/623.1
See application file for complete search history.

(56) References Cited

U.S. PATENT DOCUMENTS

| | | | | |
|---|---|---|---|---|
| 2,040,255 | A | * | 5/1936 | Gordon .......................... 429/123 |
| 2,420,456 | A | * | 5/1947 | White ........................... 429/140 |
| 2,905,738 | A | * | 9/1959 | Di Pasquale et al. .......... 429/234 |
| 2,918,983 | A | * | 12/1959 | Maitland et al. .............. 180/68.5 |
| 2008/0138706 | A1 | * | 6/2008 | Takayama et al. ............. 429/210 |

FOREIGN PATENT DOCUMENTS

WO    WO-2010/070267 A1 *   6/2010   .............. H01M 6/40

* cited by examiner

*Primary Examiner* — Kenneth Douyette
(74) *Attorney, Agent, or Firm* — Brownstein Hyatt Farber Schreck, LLP

(57) ABSTRACT

The disclosed embodiments provide a battery cell. The battery cell includes a set of layers including a cathode with an active coating, a separator, and an anode with an active coating. The battery cell also includes a pouch enclosing the layers, wherein the pouch is flexible. The resistance of the battery cell to mechanical stress may be improved by removing material from one or more of the layers to form one or more apertures within the battery cell and placing a mechanical support in each of the apertures.

25 Claims, 10 Drawing Sheets

MECHANICAL SUPPORTS FOR IMPROVING RESISTANCE TO MECHANICAL STRESS IN BATTERY CELLS

BACKGROUND

1. Field

The disclosed embodiments relate to batteries for portable electronic devices. More specifically, the disclosed embodiments relate to mechanical supports that improve the resistance of battery cells in portable electronic devices to mechanical stress.

2. Related Art

Rechargeable batteries are presently used to provide power to a wide variety of portable electronic devices, including laptop computers, tablet computers, mobile phones, personal digital assistants (PDAs), digital music players and cordless power tools. The most commonly used type of rechargeable battery is a lithium battery, which can include a lithium-ion or a lithium-polymer battery.

Lithium-polymer batteries often include cells that are packaged in flexible pouches. Such pouches are typically lightweight and inexpensive to manufacture. Moreover, these pouches may be tailored to various cell dimensions, allowing lithium-polymer batteries to be used in space-constrained portable electronic devices such as mobile phones, laptop computers, and/or digital cameras. For example, a lithium-polymer battery cell may achieve a packaging efficiency of 90-95% by enclosing rolled electrodes and electrolyte in an aluminized laminated pouch. Multiple pouches may then be placed side-by-side within the enclosure of a portable electronic device and electrically coupled in series and/or in parallel to form a battery for the portable electronic device. Because the enclosure for the portable electronic device provides physical protection for the pouches, the pouches may not require an additional battery enclosure, thus providing weight and space savings and/or increased battery capacity in the portable electronic device.

Conversely, the lack of a rigid, sealed battery enclosure may increase the susceptibility of lithium-polymer batteries to faults caused by mechanical stress. Such faults may occur during assembly of the batteries, installation of the batteries in portable electronic devices, and/or use of the portable electronic devices. For example, the dropping of an object onto a lightweight portable electronic device may dent the portable electronic device's enclosure, as well as a lithium-polymer battery underneath the enclosure. The dent may deform, weaken, and/or compress the battery's electrodes and/or separator, thus compromising the integrity of the battery and potentially resulting in degraded performance, a short circuit, chemical leakage, and/or another fault in the battery.

Hence, the use of portable electronic devices may be facilitated by mechanisms that improve the resistance of lithium-polymer battery cells to mechanical stress.

SUMMARY

The disclosed embodiments provide a battery cell. The battery cell includes a set of layers including a cathode with an active coating, a separator, and an anode with an active coating. The battery cell also includes a pouch enclosing the layers, wherein the pouch is flexible. The resistance of the battery cell to mechanical stress may be improved by removing material from one or more of the layers to form one or more apertures within the battery cell and placing a mechanical support in each of the apertures.

In some embodiments, the one or more apertures are further formed outside the pouch. For example, the aperture(s) may extend through pouch material for the pouch outside the battery cell or terminate at the pouch material outside the battery cell.

In some embodiments, the aperture(s) extend through all of the layers within the battery cell or extend through the anode and the cathode layers within the battery cell.

In some embodiments, the mechanical support includes an electrically inert material such as plastic, polycarbonate, ceramic, polypropylene, and/or polymer-coated metal. The mechanical support may also include a thermally conductive material to facilitate heat transfer within a portable electronic device containing the battery cell.

In some embodiments, the mechanical support corresponds to at least one of a post, a spacer, and a disk.

In some embodiments, each of the aperture(s) forms at least one of a circle, a rib, and a lozenge.

In some embodiments, the layers are stacked or wound to form the battery cell.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
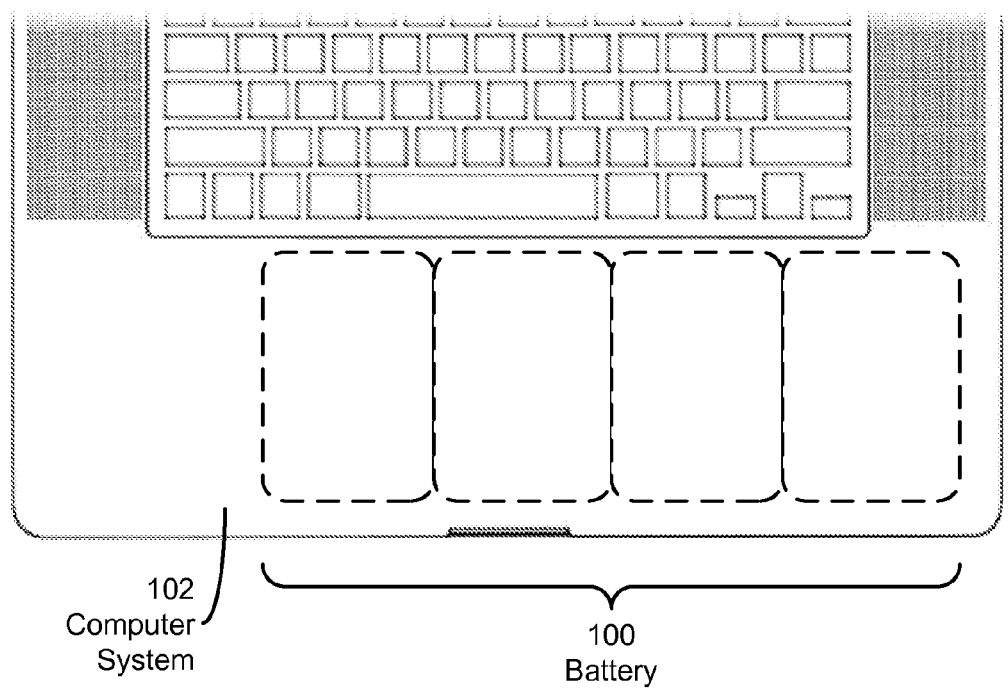
FIG. 1 shows the placement of a battery in a computer system in accordance with the disclosed embodiments.

FIG. 1 shows the placement of a battery 100 in a computer system 102 in accordance with an embodiment. Computer system 102 may correspond to a laptop computer, personal digital assistant (PDA), portable media player, mobile phone, digital camera, tablet computer, and/or other portable electronic device. Battery 100 may correspond to a lithium-polymer battery and/or other type of power source for computer system 102. For example, battery 100 may correspond to a lithium-polymer battery that includes one or more cells packaged in flexible pouches. The cells may then be connected in series and/or in parallel and used to power computer system 102.

In one or more embodiments, battery 100 is designed to accommodate the space constraints of computer system 102. For example, battery 100 may include cells of different sizes and thicknesses that are placed side-by-side, placed top-to-bottom, and/or stacked within computer system 102 to fill up the free space within computer system 102. The use of space within computer system 102 may additionally be optimized by omitting a separate enclosure for battery 100. For example, battery 100 may include non-removable pouches of lithium-polymer cells encased directly within the enclosure for computer system 102. As a result, the cells of battery 100 may be larger than the cells of a comparable removable battery, which in turn may provide increased battery capacity and weight savings over the removable battery.

On the other hand, the elimination of a separate, sealed enclosure for battery 100 may increase the susceptibility of battery 100 to contamination and/or damage. First, battery 100 may be physically vulnerable until battery 100 is encased within the enclosure for computer system 102. In addition, the enclosure for computer system 102 may provide limited protection against mechanical stress on battery 100. For example, the dropping of computer system 102 onto a hard surface and/or a hard object onto computer system 102 may dent both the enclosure for computer system 102 and one or more cells of battery 100. The dent may also deform, compress, and/or weaken the electrodes within the cell(s), potentially resulting in shortened cycle life, reduced capacity, an electrical short, chemical leakage, and/or other fault or failure in battery 100. Battery 100 may thus be susceptible to physical damage during assembly, installation in computer system 102, and/or use of computer system 102.

In one or more embodiments, the resistance of battery 100 to mechanical stress is improved by forming one or more apertures within battery 100 and placing a mechanical support in each aperture. As discussed in further detail below, the aperture(s) may be formed by removing material from one or more layers of a battery cell, including a cathode with an active coating, a separator, and an anode with an active coating. For example, each aperture may form a circle, lozenge, and/or rib within the battery cell and extend through all the layers or through the cathode and/or anode layers.

The aperture(s) may be further formed outside a pouch enclosing the layers. In particular, the aperture(s) may extend through pouch material for the pouch outside the battery cell or terminate at the pouch material outside the battery cell. A post, spacer, and/or disk containing an electrically inert and/or thermally conductive material may then be placed in each aperture to transmit structural loads through the battery cell instead of onto the layers of the battery cell, thus mitigating the formation of dents and/or other localized deformations in the battery cell. The transmission of structural loads provided by the post, spacer, and/or disk may additionally reduce the thickness of the enclosure required to meet structural load specifications for battery 100 and/or computer system 102, thus providing space savings and/or increased battery capacity over computer systems lacking such mechanical supports.

Figure 2:
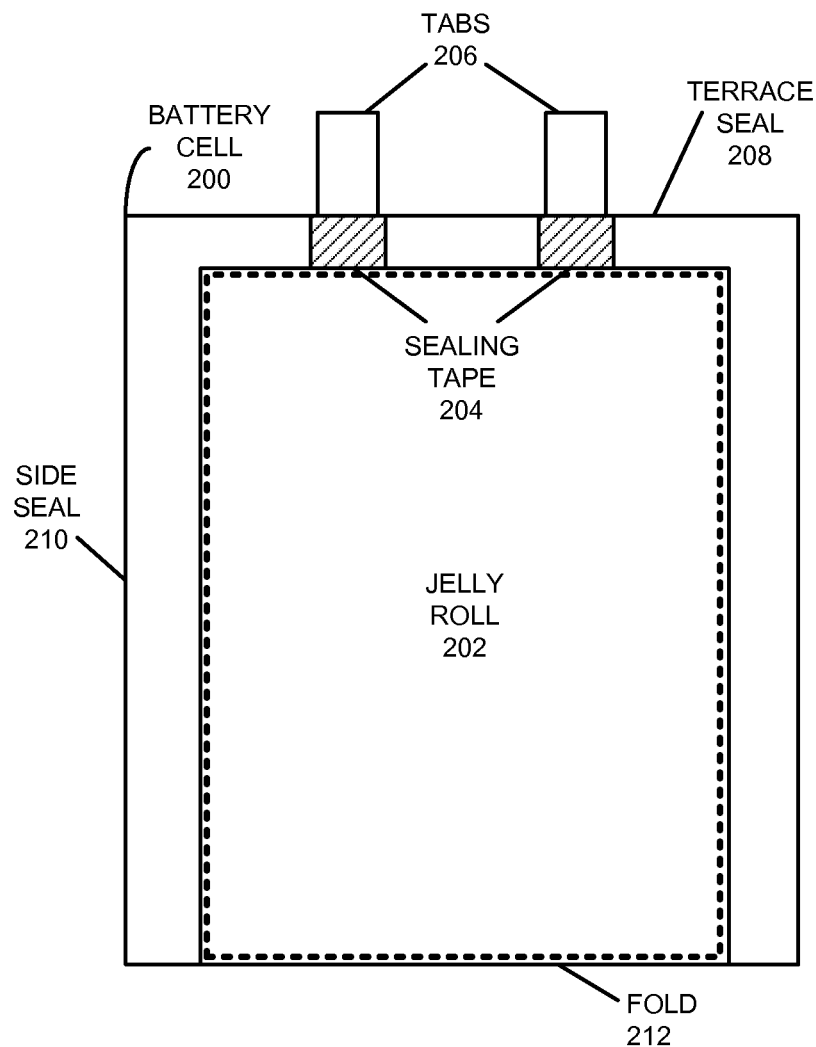
FIG. 2 shows a battery cell in accordance with the disclosed embodiments.

FIG. 2 shows a battery cell 200 in accordance with an embodiment. Battery cell 200 may correspond to a lithium-polymer cell that is used to power a portable electronic device. Battery cell 200 includes a jelly roll 202 containing a number of layers which are wound together, including a cathode with an active coating, a separator, and an anode with an active coating. More specifically, jelly roll 202 may include one strip of cathode material (e.g., aluminum foil coated with a lithium compound) and one strip of anode material (e.g., copper foil coated with carbon) separated by one strip of separator material (e.g., conducting polymer electrolyte). The cathode, anode, and separator layers may then be wound on a mandrel to form a spirally wound structure (e.g., jelly roll 202). Alternatively, the layers may be used to form other types of battery cell structures, such as bi-cell structures and/or stacked electrode structures.

During assembly of battery cell 200, jelly roll 202 is enclosed in a flexible pouch, which is formed by folding a flexible sheet along a fold line 212. For example, the flexible sheet may be made of aluminum with a polymer film, such as polypropylene and/or polyethylene. After the flexible sheet is folded, the flexible sheet can be sealed, for example by applying heat along a side seal 210 and along a terrace seal 208.

Jelly roll 202 also includes a set of conductive tabs 206 coupled to the cathode and the anode. Conductive tabs 206 may extend through seals in the pouch (for example, formed using sealing tape 204) to provide terminals for battery cell 200. Conductive tabs 206 may then be used to electrically couple battery cell 200 with one or more other battery cells to form a battery pack. For example, the battery pack may be formed by coupling the battery cells in a series, parallel, or series-and-parallel configuration.

Figure 3:
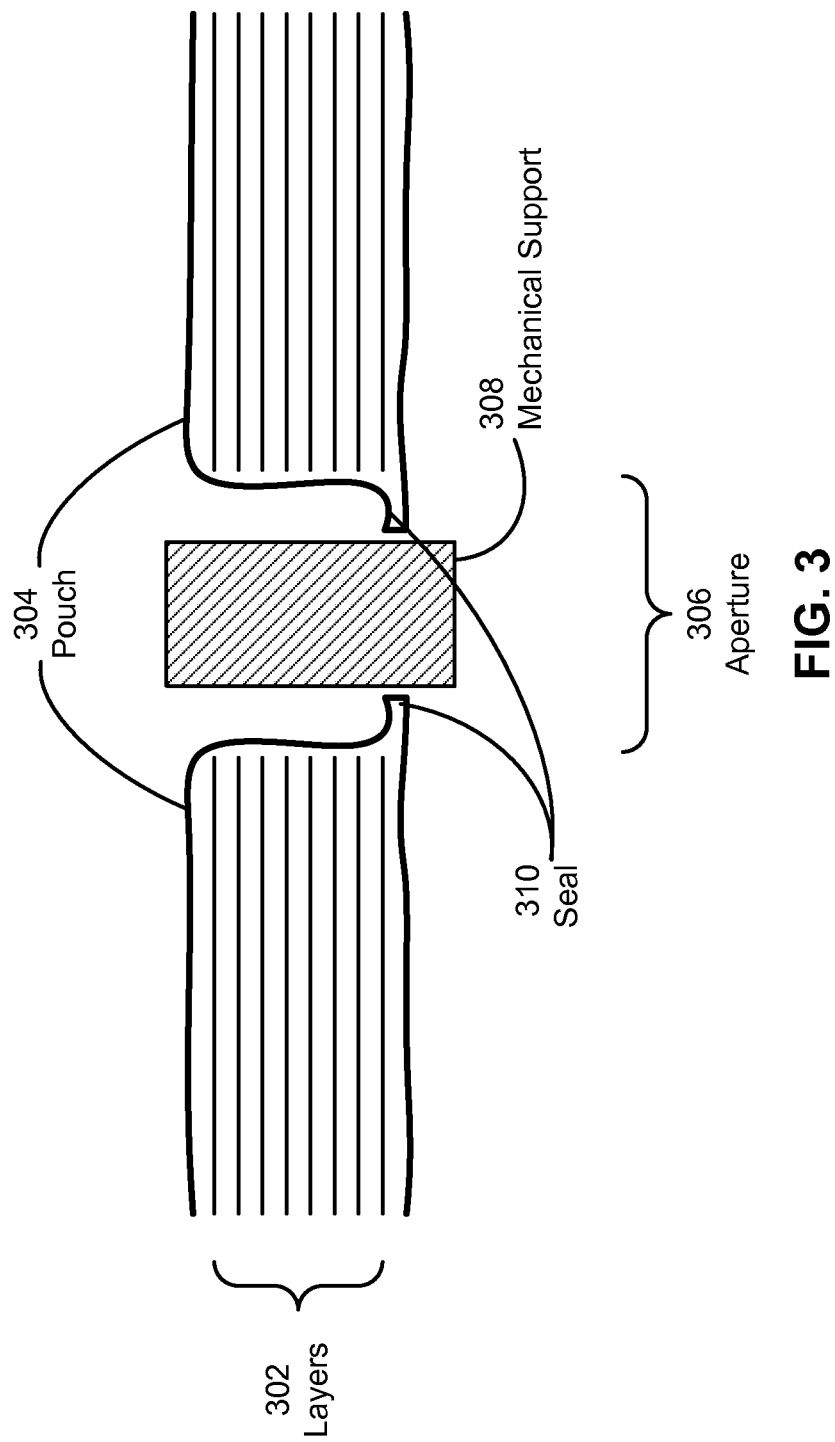
FIG. 3 shows a cross-sectional view of a battery cell in accordance with the disclosed embodiments.

FIG. 3 shows a cross-sectional view of a battery cell (e.g., battery cell 200 of FIG. 2) in accordance with the disclosed embodiments. As described above, the battery cell may contain a set of layers 302, including a cathode with an active coating, a separator, and an anode with an active coating. The layers may be wound to create a jelly roll for the battery cell, such as jelly roll 202 of FIG. 2. Alternatively, the layers may be stacked to form other types of battery cell structures. The layers may then be enclosed in a flexible pouch 304 to form the battery cell, and the battery cell may be used to power components in a portable electronic device.

As shown in FIG. 3, an aperture 306 may be formed in the battery cell by removing material from layers 302 and sealing layers 302 in pouch 304 so that aperture 306 opens along the top of the battery cell and is lined with pouch material from the pouch. For example, aperture 306 may correspond to a circular hole, a lozenge, and/or a rib in the battery cell. In addition, aperture 306 may be configured to extend through the pouch material by removing pouch material along the bottom of the battery cell within aperture 306 and forming a seal 310 in pouch 304 next to the removed pouch material. A mechanical support 308 composed of plastic, polycarbonate, ceramic, polypropylene, polymer-coated metal, and/or another type of stiff, electrically inert material may then be placed in aperture 306 to improve the resistance of the battery cell to mechanical stress. For example, mechanical support 308 may correspond to a post in an enclosure for the portable electronic device that transmits a structural load experienced by the enclosure at the top of the battery cell through the cell, thus mitigating denting and/or other localized deformation in layers 302.

Mechanical support 308 may also contain a thermally conductive material to facilitate heat dissipation in the portable electronic device. For example, mechanical support 308 may provide a thermal path from a heat source such as a processor at the bottom of the battery cell to the enclosure for the portable electronic device at the top of the battery cell. In other words, mechanical support 308 may facilitate the operation of the portable electronic device by transmitting both structural loads and heat through the battery cell instead of onto the battery cell.

Figure 4:
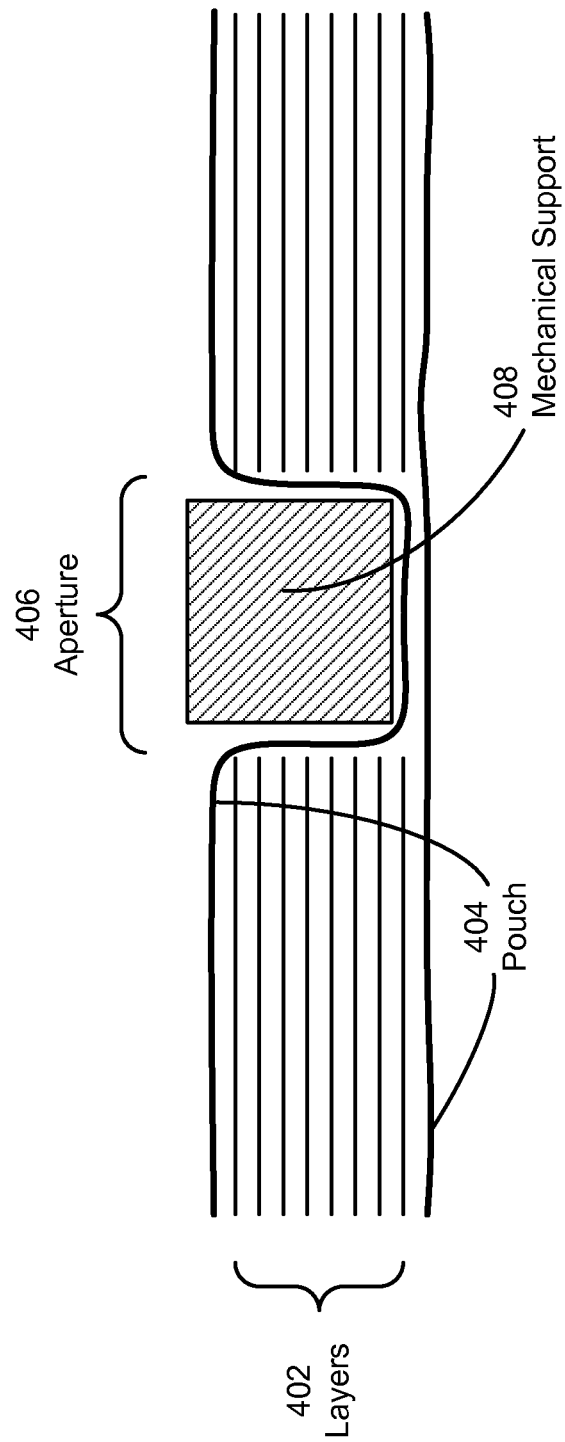
FIG. 4 shows a cross-sectional view of a battery cell in accordance with the disclosed embodiments.

FIG. 4 shows a cross-sectional view of a battery cell in accordance with the disclosed embodiments. As with the battery cell of FIG. 3, the battery cell of FIG. 4 includes a set of layers 402 enclosed in a pouch 404. An aperture 406 may also be formed in the battery cell by removing material from layers 402 and sealing layers 402 in pouch 404 so that aperture 406 opens along the top of the battery cell and is lined with pouch material from the pouch. A mechanical support 408 (e.g., post, spacer, etc.) may then be placed in aperture 406 to improve the resistance of the battery cell to mechanical stress and/or facilitate heat transfer within a portable electronic device containing the battery cell.

However, aperture 406 terminates at pouch material for pouch 404 along the bottom of the battery cell instead of extending through the pouch material. As a result, aperture 406 may lack a seal in the pouch material, such as seal 310 of FIG. 3. In turn, the absence of a seal in aperture 406 may facilitate efficient use of space within the portable electronic device by allowing mechanical support 408 to be positioned much closer to the walls of aperture 406 than in an aperture containing a seal, such as aperture 306 of FIG. 3. For example, the space occupied by and above seal 310 in the battery cell of FIG. 3 may be used by layers 402 in the battery cell of FIG. 4, thus increasing the energy density of the battery cell of FIG. 4 over that of the battery cell of FIG. 3.

Figure 5:
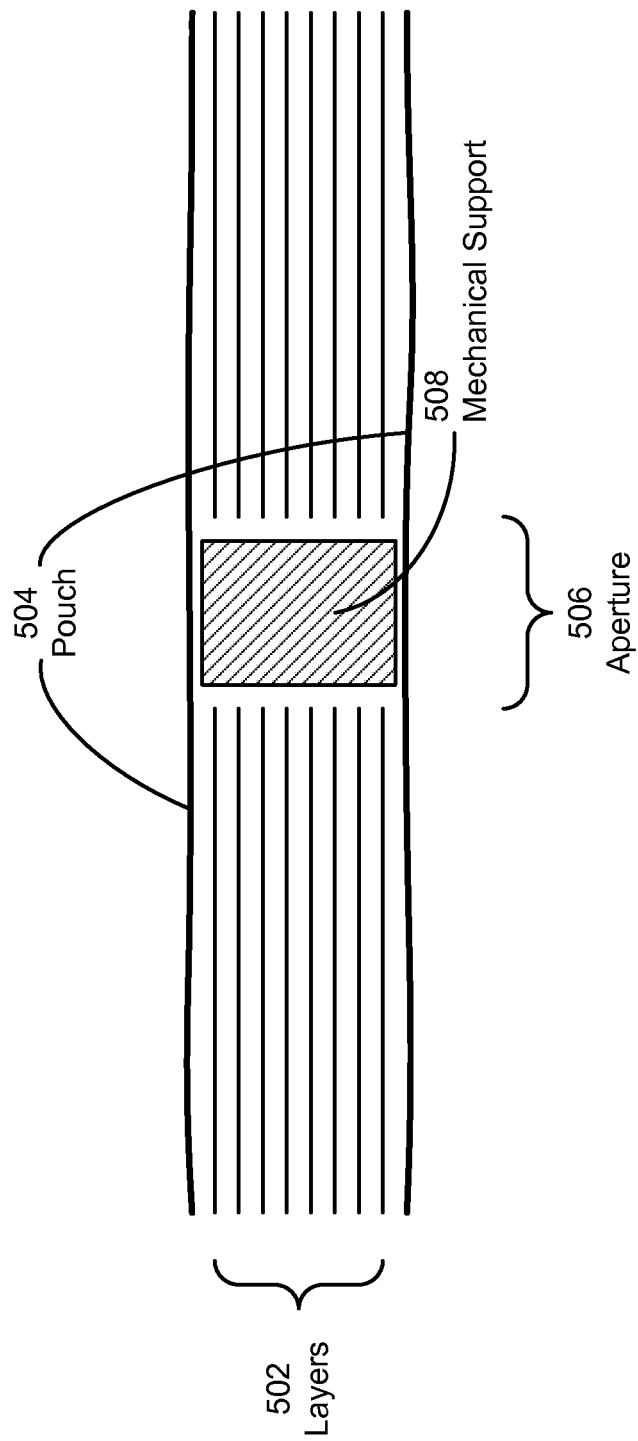
FIG. 5 shows a cross-sectional view of a battery cell in accordance with the disclosed embodiments.

FIG. 5 shows a cross-sectional view of a battery cell in accordance with the disclosed embodiments. Like the battery cells of FIGS. 3-4, the battery cell of FIG. 5 includes a set of layers 502 enclosed in a pouch 504, as well as an aperture 506 formed by removing material from layers 502. For example, aperture 506 may be created by punching holes in sheets of cathode, anode, and separator and stacking the sheets so that the holes are aligned. Conversely, aperture 506 may be created by spacing holes in unwound sheets of cathode, anode, and separator so that the holes are aligned after the sheets are wound to create a jelly roll (e.g., jelly roll 202 of FIG. 2).

However, unlike apertures 306 and 406 of FIGS. 3-4, aperture 506 is formed within the battery cell instead of outside the battery cell. Prior to sealing layers 502 in pouch, a mechanical support 508 may be placed in aperture 506 to improve the resistance of the battery cell to mechanical stress. For example, mechanical support 408 may correspond to a spacer made of plastic, polycarbonate, ceramic, polypropylene, polymer-coated metal, and/or another electrically inert material that spans the thickness of the battery cell. Mechanical support 508 may also include a thermally conductive material to facilitate heat transfer in a portable electronic device powered by the battery cell.

Figure 6:
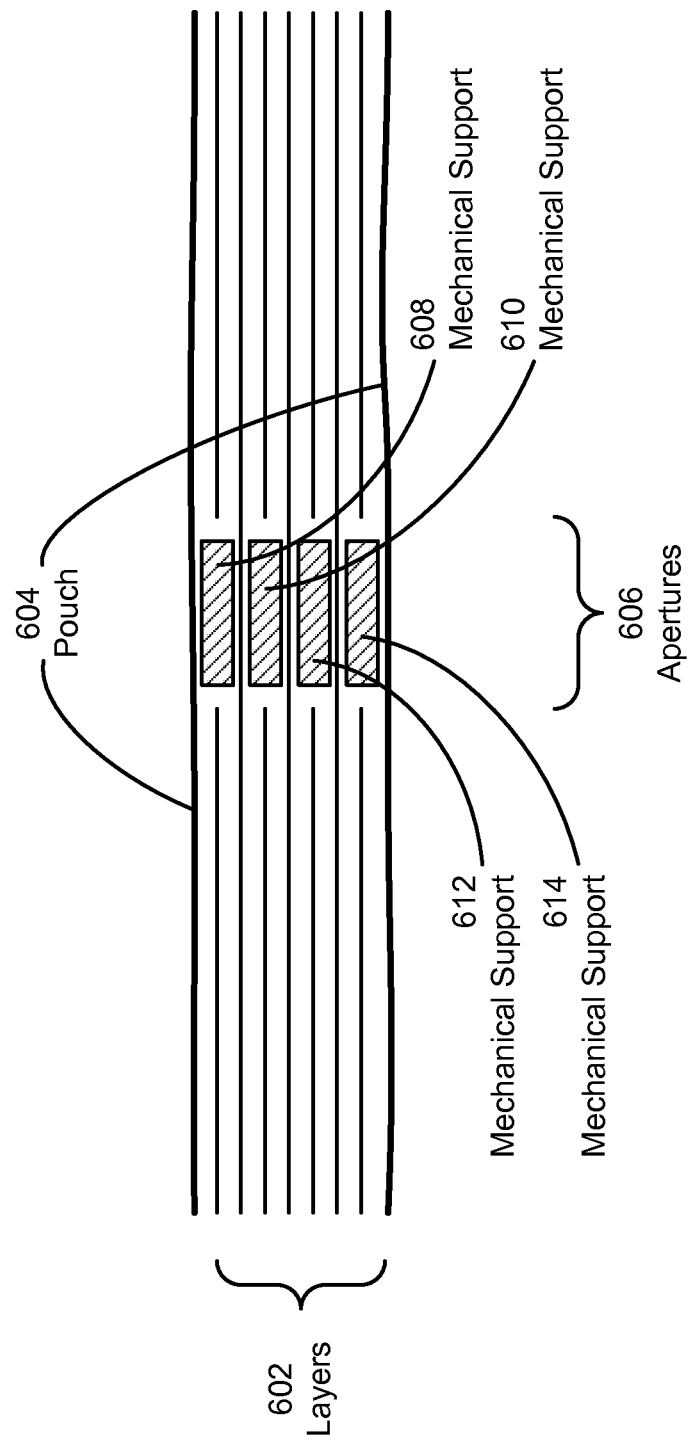
FIG. 6 shows a cross-sectional view of a battery cell in accordance with the disclosed embodiments.

FIG. 6 shows a cross-sectional view of a battery cell in accordance with the disclosed embodiments. The battery cell of FIG. 6 includes a set of layers 602 enclosed in a pouch 604. In addition, a set of apertures 606 is formed within the battery cell by removing material from some layers 602. For example, apertures 606 may be formed by punching holes in the anode and cathode layers but not the separator layers of the battery cell.

A set of mechanical supports 608-614 may then be placed within apertures 606 to transmit a structural load through the battery cell instead of onto layers 602. Mechanical supports 608-614 may be formed as a set of disks by depositing stiff, electrically inert material in apertures 606. The disks may then be stacked on top of one another during the creation of the battery cell to facilitate the transmission of structural loads through the battery cell instead of onto layers 602.

Figure 7:
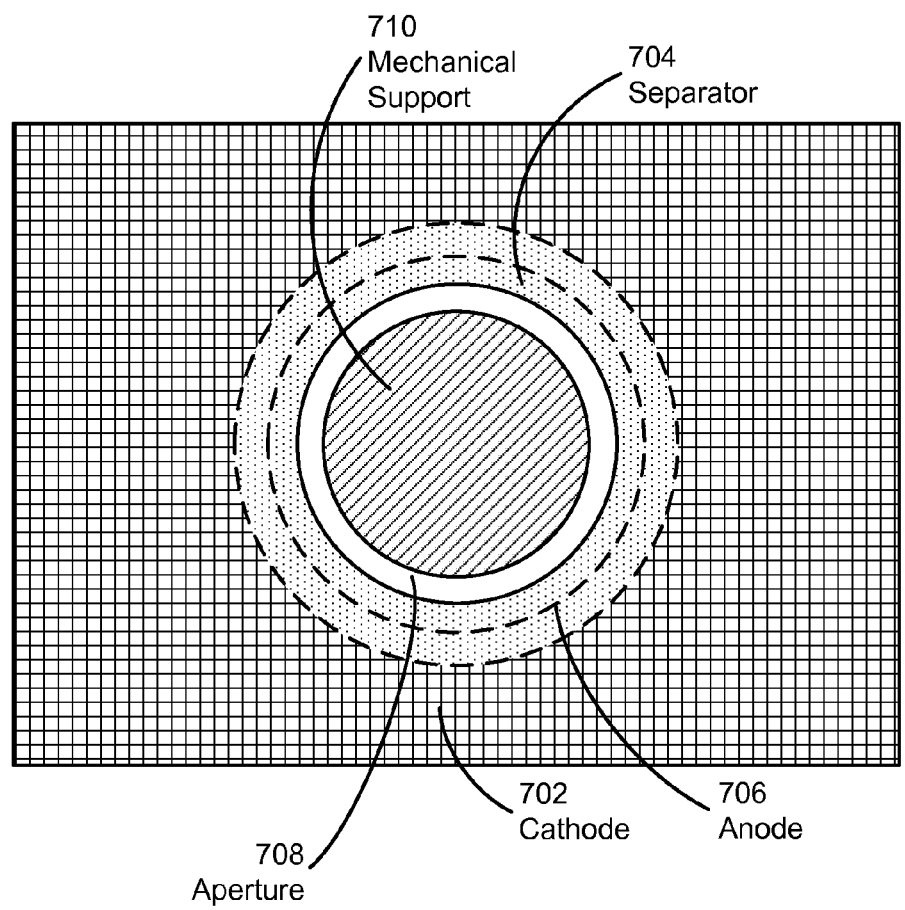
FIG. 7 shows a top-down view of a set of layers for a battery cell in accordance with the disclosed embodiments.

FIG. 7 shows a top-down view of a set of layers for a battery cell in accordance with the disclosed embodiments. As shown in FIG. 7, the layers include a cathode 702, a separator 704 underneath cathode 702, and an anode 706 underneath separator 704. An aperture 708 may be formed by removing material from cathode 702, separator 704, and anode 706, and a mechanical support 710 may be placed in aperture 708 to improve the resistance of the battery cell to mechanical stress.

To prevent electrical shorts in the battery cell, material may be removed from the layers so that separator 704 extends beyond the material removed from cathode 702 and anode 706. For example, separator 704 may include an "overhang" of 0.8-1 mm to ensure that cathode 702 and anode 706 are insulated from one another, even at high temperatures that cause separator 704 to shrink slightly. Alternatively, insulation of cathode 702 and anode 706 may be provided by removing material only from cathode 702 and anode 706 and not from separator 704, as described above with respect to FIG. 6.

Figure 8:
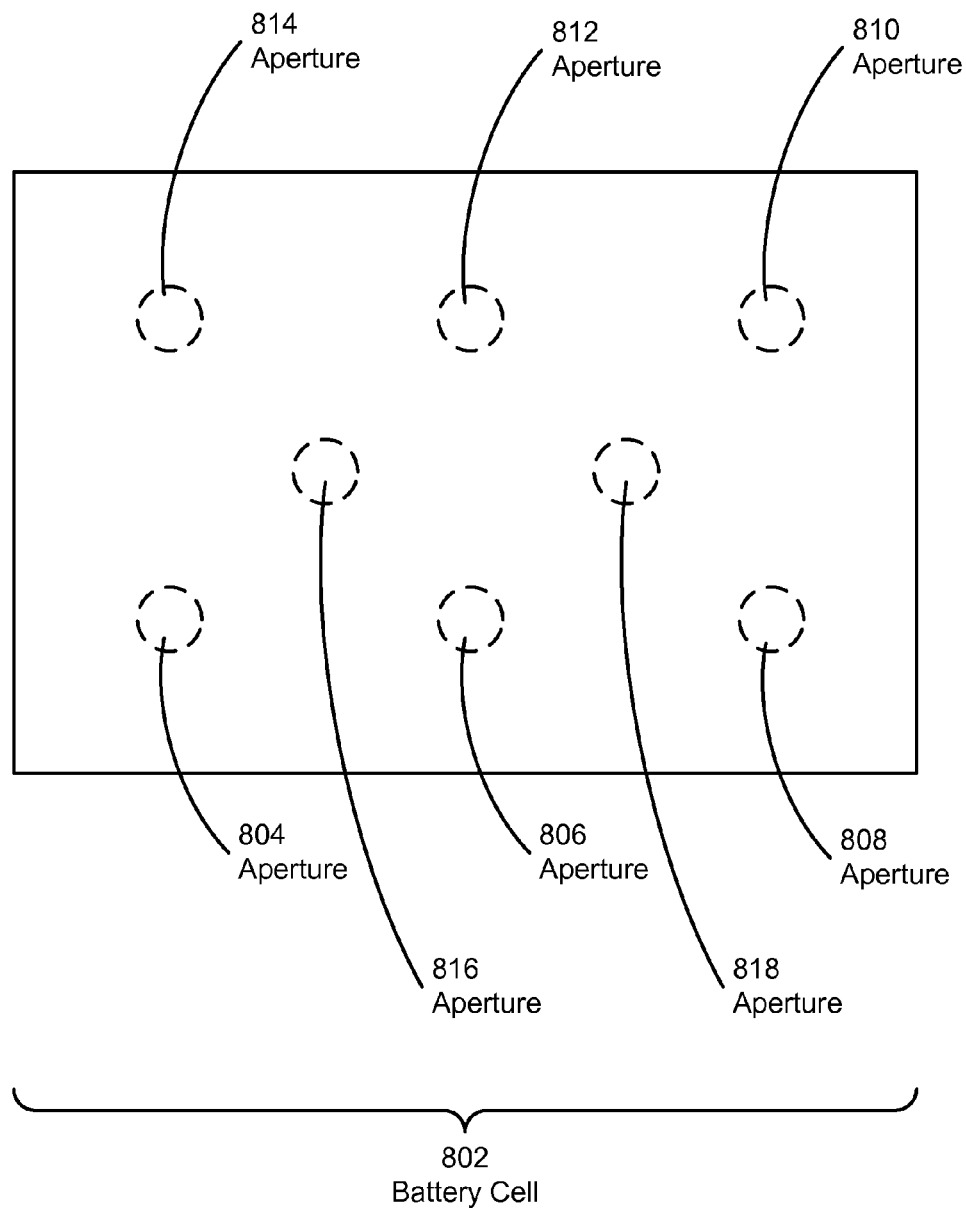
FIG. 8 shows an exemplary arrangement of apertures in a battery cell in accordance with the disclosed embodiments.

FIG. 8 shows an exemplary arrangement of apertures 804-818 in a battery cell 802 in accordance with the disclosed embodiments. Battery cell 802 may include a set of layers enclosed in a flexible pouch. Battery cell 802 may also be placed within an enclosure for a portable electronic device and used to power components in the portable electronic device.

As mentioned above, apertures 804-818 may contain mechanical supports that improve the resistance of battery cell 802 to mechanical stress. Such mechanical supports may correspond to posts that form a portion of the portable electronic device's enclosure and/or spacers or disks that are not attached to the enclosure. The mechanical supports may improve the resistance of battery cell 802 to mechanical stress by transmitting structural loads through battery cell 802 instead of onto the layers of battery cell 802.

In addition, the number, size, placement, dimensions, and/or spacing of the mechanical supports may be selected based on the thickness of the enclosure and/or the dimensions of battery cell 802 and/or the portable electronic device. For example, a mechanical support may be placed in a single aperture in the middle of battery cell 802, and exterior supports may be placed around the perimeter of battery cell 802 to transfer structural loads away from battery cell 802 and onto other parts of the portable electronic device. The aperture and/or mechanical support may form a circle and/or lozenge if battery cell 802 is relatively square and a rib if battery cell 802 is oblong. Similarly, multiple mechanical supports may be positioned closer together within battery cell 802 to offset a decrease in the thickness of the portable electronic device's enclosure. Finally, one or more mechanical supports may be positioned underneath a structurally sensitive portion of the enclosure to prevent damage to battery cell 802 from an object impacting the structurally sensitive portion.

Figure 9:
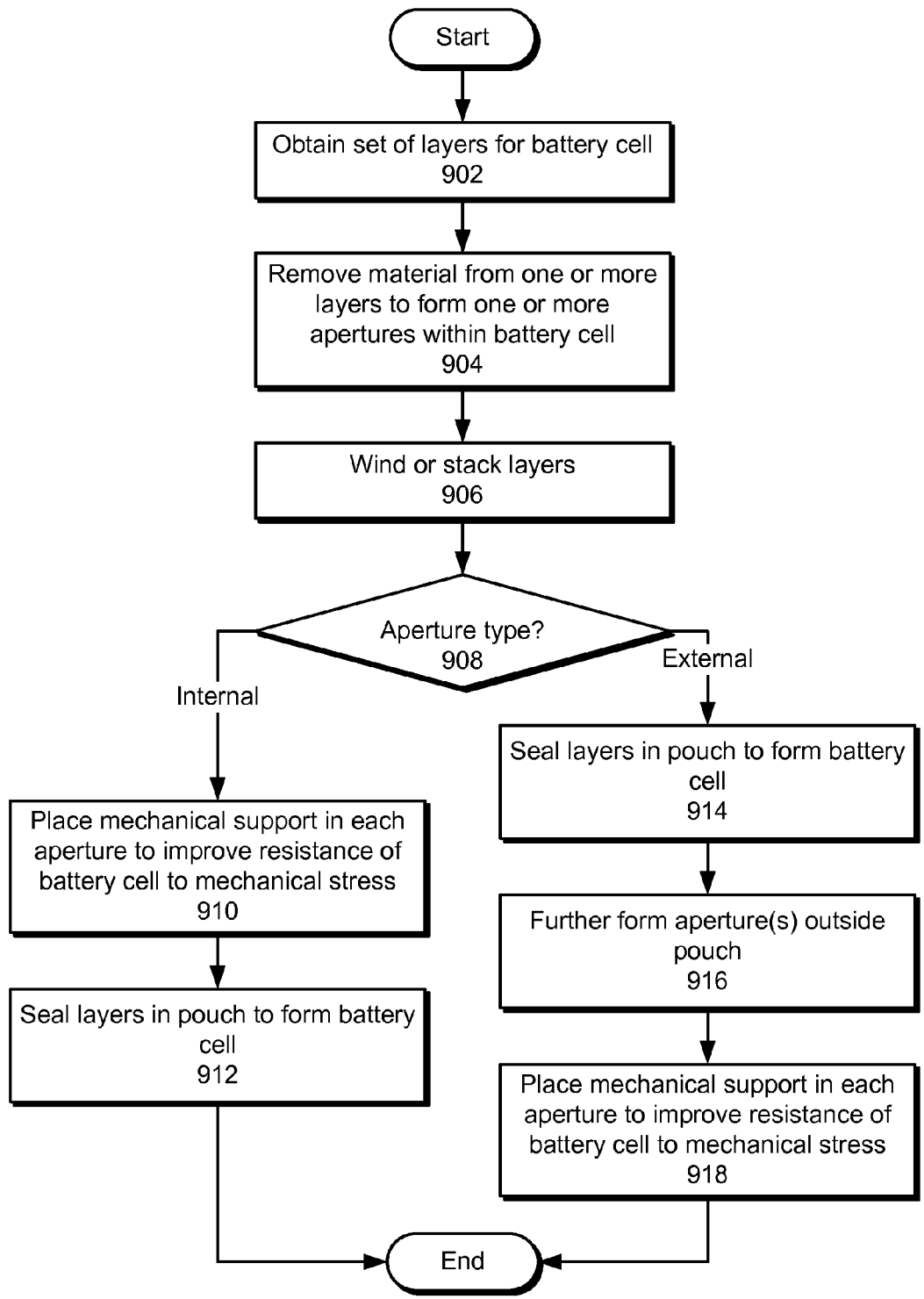
FIG. 9 shows a flowchart illustrating the process of manufacturing a battery cell in accordance with the disclosed embodiments.

FIG. 9 shows a flowchart illustrating the process of manufacturing a battery cell in accordance with the disclosed embodiments. In one or more embodiments, one or more of the steps may be omitted, repeated, and/or performed in a different order. Accordingly, the specific arrangement of steps shown in FIG. 9 should not be construed as limiting the scope of the embodiments.

Initially, a set of layers for the battery cell is obtained (operation 902). The layers may include a cathode with an active coating, a separator, and an anode with an active coating. Next, material is removed from one or more of the layers to form one or more apertures within the battery cell (operation 904). For example, the material may be removed to form circles, ribs, and/or lozenges in and/or through the layers. The layers may then be wound or stacked (operation 906). For example, the layers may be wound and/or stacked in a way that forms the desired shape for the battery cell and aligns the removed material in the layers to form the aperture(s).

The battery cell may then be created based on the aperture type (operation 908) of the aperture(s). If the aperture(s) are internal to the battery cell, a mechanical support is placed in each aperture to improve the resistance of the battery cell to mechanical stress (operation 910), and the layers are sealed in a pouch to form the battery cell (operation 912). For example, the mechanical support may correspond to a spacer that spans the thickness of the battery cell, or the mechanical support may correspond to a disk that fills in material removed from the cathode and/or anode of the battery cell.

If the aperture(s) are external to the battery cell, the layers are first sealed in the pouch to form the battery cell (operation 914). Next, the aperture(s) are further formed outside the pouch (operation 916). For example, the aperture(s) may be formed by lining the aperture(s) with pouch material for the pouch and either extending the aperture(s) through the pouch material or terminating the aperture(s) at the pouch material. Finally, a mechanical support is placed in each aperture to improve the resistance of the battery cell to mechanical stress (operation 918). For example, the mechanical support may correspond to a post in an enclosure for a portable electronic device containing the battery cell. Structural loads experienced by the enclosure may be transferred through the battery cell by the post instead of onto the layers of the battery cell.

Figure 10:
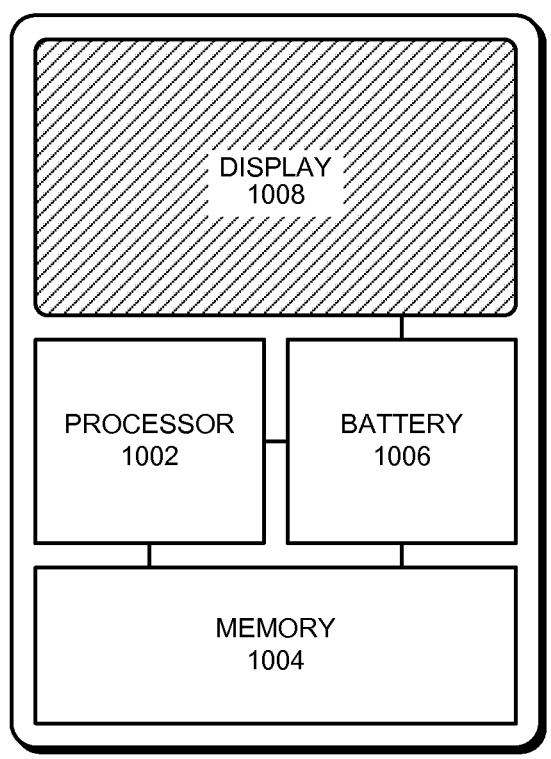
FIG. 10 shows a portable electronic device in accordance with the disclosed embodiments.

The above-described rechargeable battery cell can generally be used in any type of electronic device. For example, FIG. 10 illustrates a portable electronic device 1000 which includes a processor 1002, a memory 1004 and a display 1008, which are all powered by a battery 1006. Portable electronic device 1000 may correspond to a laptop computer, mobile phone, PDA, tablet computer, portable media player, digital camera, and/or other type of battery-powered electronic device. Battery 1006 may correspond to a battery pack that includes one or more battery cells. Each battery cell may include a set of layers sealed in a pouch, including a cathode with an active coating, a separator, and an anode with an active coating. The resistance of the battery cell to mechanical stress may be improved by removing material from one or more of the layers to form one or more apertures within the battery cell and placing a mechanical support in each of the apertures. Each aperture may extend through all of the layers within the battery cell or through the anode and the cathode layers within the battery cell. Alternatively, the aperture may be formed outside the battery cell, such that the aperture extends through pouch material for the pouch or terminates at the pouch material.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for manufacturing a battery cell, comprising:
obtaining a set of layers for the battery cell, wherein the set of layers comprises a cathode layer with an active coating, a separator, and an anode layer with an active coating;
removing material from one or more of the layers to form one or more apertures within the battery cell, wherein the one or more apertures extend through the anode layer and the cathode layer; and
placing a mechanical support in each of the one or more apertures to improve a resistance of the battery cell to mechanical stress.

2. The method of claim 1, further comprising:
sealing the layers in a pouch to form the battery cell, wherein the pouch is flexible.

3. The method of claim 2, further comprising:
stacking the layers prior to sealing the layers in the pouch.

4. The method of claim 2, further comprising:
winding the layers to create a jelly roll prior to sealing the layers in the pouch.

5. The method of claim 2, further comprising:
further forming the one or more apertures outside the pouch.

6. The method of claim 5, wherein the one or more apertures:
extend through pouch material for the pouch outside the battery cell; or terminate at the pouch material outside the battery cell.

7. The method of claim 1, wherein the one or more apertures:
extend through all of the layers within the battery cell; or
extend through all of the anode and the cathode layers within the battery cell.

8. The method of claim 1, wherein the mechanical support comprises at least one of:
plastic;
polycarbonate;
ceramic;
polypropylene;
polymer-coated metal; and
a thermally conductive material.

9. The method of claim 1, wherein the mechanical support corresponds to at least one of a post, a spacer, and a disk.

10. The method of claim 1, wherein each of the one or more apertures forms at least one of a circle, a rib, and a lozenge.

11. A battery cell, comprising:
a set of layers comprising a cathode layer with an active coating, a separator, and an anode layer with an active coating;

a mechanical support disposed in an aperture of the battery cell; and a pouch enclosing the layers, wherein the pouch is flexible, wherein material has been removed from one or more of the layers to form the aperture that extends through the anode layer and the cathode layer.

12. The battery cell of claim 11, wherein the aperture is further formed outside the pouch.

13. The battery cell of claim 12, wherein the aperture:
extends through pouch material for the pouch outside the battery cell; or
terminates at the pouch material outside the battery cell.

14. The battery cell of claim 11, wherein the aperture:
extends through all of the layers within the battery cell; or
extends through all of the anode and the cathode layers within the battery cell.

15. The battery cell of claim 11, wherein the mechanical support comprises at least one of:
plastic;
polycarbonate;
ceramic;
polypropylene;
polymer-coated metal; and
a thermally conductive material.

16. The battery cell of claim 11, wherein the mechanical support corresponds to at least one of a post, a spacer, and a disk.

17. The battery cell of claim 11, wherein the aperture forms at least one of a circle, a rib, and a lozenge.

18. The battery cell of claim 11, wherein the layers are stacked or wound to form the battery cell.

19. A portable electronic device, comprising:
a set of components powered by a battery pack; and
the battery pack, comprising:
a battery cell, comprising:
a set of layers comprising at least one cathode layer with an active coating,
a separator,
at least one anode layer with an active coating,
a mechanical support disposed in an aperture formed by removing material from the at least one anode layer and the at least one cathode layer; and
a pouch enclosing the layers, wherein the pouch is flexible.

20. The portable electronic device of claim 19, wherein the aperture is further formed outside the pouch.

21. The portable electronic device of claim 20, wherein the aperture:
extends through pouch material for the pouch outside the battery cell; or
terminates at the pouch material outside the battery cell.

22. The portable electronic device of claim 19, wherein the aperture:
extends through all of the layers within the battery cell; or
extends through all of the anode and the cathode layers within the battery cell.

23. The portable electronic device of claim 19, wherein the mechanical support comprises at least one of:
plastic;
polycarbonate;
ceramic;
polypropylene;
polymer-coated metal; and
a thermally conductive material.

24. The portable electronic device of claim 19, wherein the mechanical support corresponds to at least one of a post, a spacer, and a disk.

25. The portable electronic device of claim 19, wherein the mechanical support further forms a portion of an enclosure for the portable electronic device.

* * * * *